(12) United States Patent
Leppanen et al.

(10) Patent No.: US 11,320,894 B2
(45) Date of Patent: May 3, 2022

(54) DYNAMIC CONTROL OF HOVERING DRONE

(71) Applicant: Nokia Technologies Oy, Espoo (FI)

(72) Inventors: Jussi Leppanen, Tampere (FI); Mikko-Ville Laitinen, Espoo (FI); Arto Lehtiniemi, Lempaala (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 380 days.

(21) Appl. No.: 16/444,201

(22) Filed: Jun. 18, 2019

(65) Prior Publication Data

US 2020/0004320 A1    Jan. 2, 2020

(30) Foreign Application Priority Data

Jul. 2, 2018    (EP) .................................... 18181125

(51) Int. Cl.
| | | |
|---|---|---|
| *G06F 3/01* | (2006.01) | |
| *B64C 39/02* | (2006.01) | |
| *G01C 21/20* | (2006.01) | |
| *G05D 1/00* | (2006.01) | |
| *G06F 3/041* | (2006.01) | |
| *G06F 3/14* | (2006.01) | |
| *G06F 3/16* | (2006.01) | |

(52) U.S. Cl.
CPC ............ *G06F 3/011* (2013.01); *B64C 39/024* (2013.01); *G01C 21/20* (2013.01); *G05D 1/0094* (2013.01); *G06F 3/017* (2013.01); *G06F 3/041* (2013.01); *G06F 3/14* (2013.01); *G06F 3/16* (2013.01); *B64C 2201/12* (2013.01); *B64C 2201/141* (2013.01)

(58) Field of Classification Search
CPC .......... G06F 3/011; G06F 3/017; G06F 3/041; G06F 3/14; G06F 3/16; B64C 39/024; B64C 2201/12; B64C 2201/141; G01C 21/20; G05D 1/0094; G05D 1/0016; G05D 1/0033; H04N 5/00
See application file for complete search history.

(56) References Cited

U.S. PATENT DOCUMENTS

| | | | |
|---|---|---|---|
| 2015/0092020 A1* | 4/2015 | Vaughn | G10L 19/167 348/47 |
| 2016/0349835 A1 | 12/2016 | Shapira | |
| 2017/0161561 A1* | 6/2017 | Marty | H04N 5/23238 |
| 2018/0095461 A1 | 4/2018 | Taylor et al. | |

* cited by examiner

*Primary Examiner* — Pei Yong Weng
(74) *Attorney, Agent, or Firm* — Harrington & Smith

(57) ABSTRACT

Apparatus, a method and a computer program are provided. The apparatus includes circuitry for causing rendering of mediated reality content to a user, wherein the mediated reality content includes virtual visual content rendered on a display of a hovering drone. The apparatus also includes circuitry for determining a real location of the user in real space. The apparatus further includes circuitry for dynamically adjusting a real location of the hovering drone, relative to the determined real location of the user, based at least in part on at least one characteristic of the mediated reality content rendered to the user.

20 Claims, 11 Drawing Sheets

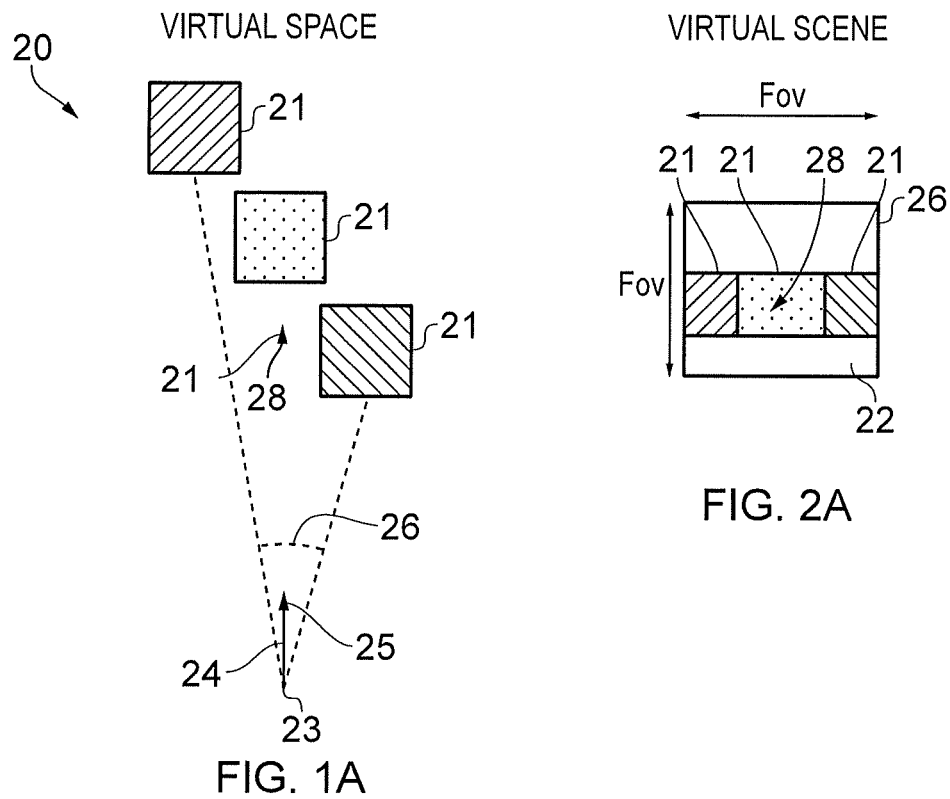
FIG. 1A
FIG. 2A
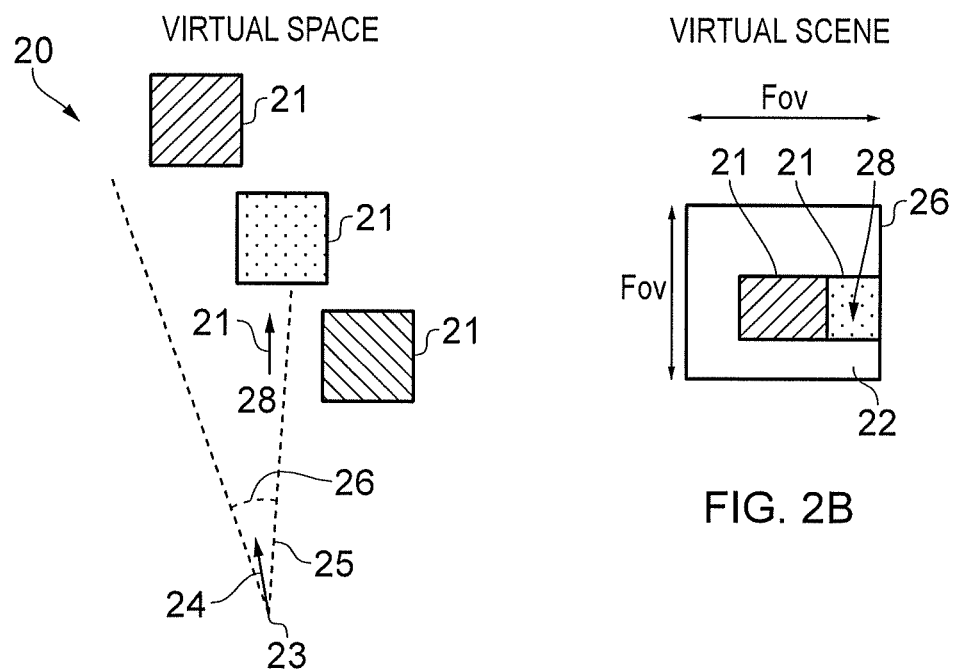
FIG. 1B
FIG. 2B

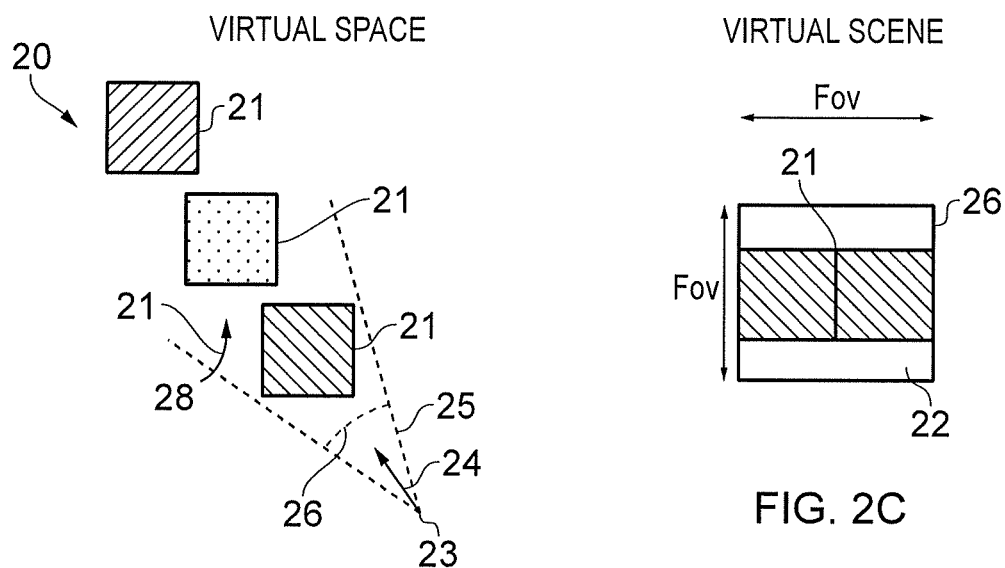
FIG. 1C
FIG. 2C
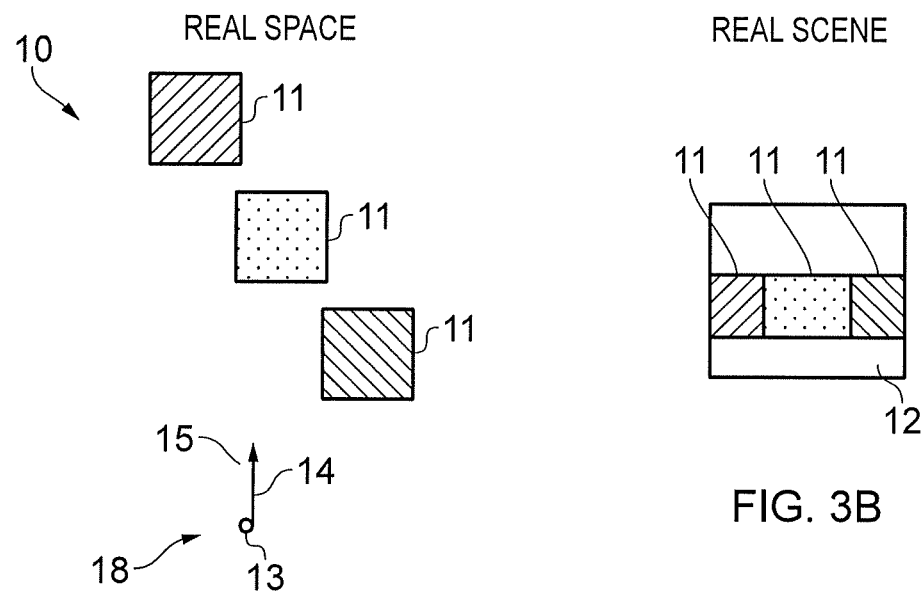
FIG. 3A
FIG. 3B

DYNAMIC CONTROL OF HOVERING DRONE

TECHNOLOGICAL FIELD

Embodiments of the present disclosure relate to dynamic control of a hovering drone. More specifically, they relate to dynamic control of a hovering drone in the provision of mediated reality content.

BACKGROUND

Mediated reality allows a user to visually experience a fully or partially artificial environment (a virtual space) as a virtual scene at least partially rendered by an apparatus to a user. The virtual scene is determined by a point of view of a user within the virtual space. The point of view of the user depends upon a virtual location of the user and a virtual orientation of the user.

First-person perspective mediation means that the user's real point of view within a real space determines the point of view of the user within the virtual space, changing the virtual scene. The virtual orientation of the user depends on the real orientation of the user. A variation in the user's real orientation determines a variation in the virtual orientation of the user within the virtual space.

BRIEF SUMMARY

According to various, but not necessarily all, embodiments there is provided an apparatus comprising means for causing rendering of mediated reality content to a user, wherein the mediated reality content comprises virtual visual content rendered on a display of a hovering drone. The apparatus also comprises means for determining a real location of the user in real space. The apparatus further comprises means for causing dynamic adjustment of a real location of the hovering drone, relative to the determined real location of the user, based at least in part on at least one characteristic of the mediated reality content rendered to the user. According to various, but not necessarily all, embodiments there is provided an apparatus comprising memory storing computer program instructions and at least one processor. The at least one processor is configured to perform/execute the computer program instructions. When the computer program instructions are performed, they cause the apparatus to: cause rendering of mediated reality content to a user, wherein the mediated reality content comprises virtual visual content rendered on a display of a hovering drone; determining a real location of the user in real space; and cause dynamic adjustment of a real location of the hovering drone, relative to the determined real location of the user, based at least in part on at least one characteristic of the mediated reality content rendered to the user.

The computer program instructions may be configured, when performed by the at least one processor, to cause the apparatus to: determine a real point of view of the user; and cause dynamic adjustment of the real location of the hovering drone based at least in part on the determined real point of view of the user.

The real location of the hovering drone may be dynamically adjusted based at least in part on the virtual visual content rendered, to the user, on the display of the hovering drone.

The real location of the hovering drone may be dynamically adjusted by reducing the distance between the real location of the hovering drone and the real location of the user. The dynamic adjustment may be based at least in part on the user approaching an interactive virtual visual object provided by the virtual visual content.

The hovering drone may be configured to detect touch input from the user and/or non-touch gesture input from the user. Reducing the distance between the real location of the hovering drone and the real location of the user may enable touch input and/or non-touch gesture input from the user to be detected or improve an accuracy of detection of touch input and/or non-touch gesture input from the user.

The mediated reality content may comprise virtual aural content rendered to the user. The real location of the hovering drone may be dynamically adjusted based at least in part on the virtual aural content rendered to the user.

The mediated reality content may comprise virtual visual content and virtual aural content. The at least one characteristic of the mediated reality content may depend on a comparative importance of the virtual visual content and the virtual aural content.

The computer program instructions may be configured, when performed by the at least one processor, to cause the apparatus to: cause the distance between the real location of the hovering drone and the real location of the user to be increased to a predefined maximum distance, based at least in part on a determination that the virtual aural content is more important than the virtual visual content in a given portion of the mediated reality content.

The computer program instructions may be configured, when performed by the at least one processor, to cause the apparatus to: adjust gain of the virtual aural content based at least in part on the distance between the real location of the user and the real location of the hovering drone.

The hovering drone generates a noise that is audible to the user when hovering and increasing the distance between the real location of the hovering drone and the real location of the user reduces the loudness of that noise to the user.

The computer program instructions may be configured, when performed by the at least one processor, to cause the apparatus to: cause the distance between the real location of the hovering drone and the real location of the user to be reduced, based at least in part on a determination that the virtual visual content is more important than the virtual aural content in a given portion of the mediated reality content.

The hovering drone may be configured to detect touch input from the user and/or non-touch gesture input from the user. Reducing the distance between the real location of the hovering drone and the real location of the user may enable touch input and/or non-touch gesture input from the user to be detected or improve an accuracy of detection of touch input and/or non-touch gesture input from the user.

According to various, but not necessarily all, embodiments there is provided a method. The method comprises causing rendering of mediated reality content to a user. The mediated reality content comprises virtual visual content rendered on a display of a hovering drone. The method also comprises determining a real location of the user in real space. The method further comprises causing dynamic adjustment of a real location of the hovering drone, relative to the determined real location of the user, based at least in part on at least one characteristic of the mediated reality content rendered to the user.

According to various, but not necessarily all, embodiments there is provided computer program instructions. The computer program instructions, when performed by one or more processors, cause the one or more processors to perform at least: causing rendering of mediated reality content to a user, wherein the mediated reality content comprises virtual visual content rendered on a display of a hovering drone; determining a real location of the user in real space; and causing dynamic adjustment of a real location of the hovering drone, relative to the determined real location of the user, based at least in part on at least one characteristic of the mediated reality content rendered to the user.

According to various, but not necessarily all, embodiments there is provided an apparatus comprising means for causing rendering of mediated reality content to a user. The mediated reality content comprises virtual visual content rendered on a display of a hovering drone. The apparatus comprises means for monitoring an orientation of a user's real point of view, over a period of time, while the virtual visual content is rendered on the display of the hovering drone. The apparatus also comprises means for determining at least one rate of change, over the period of time, of the orientation of the user's real point of view. The apparatus further comprises means for causing a distance between a real location of the hovering drone and a real location of the user to reduce based, at least in part, on the determined rate of change.

According to various, but not necessarily all, embodiments there is provided an apparatus comprising memory storing computer program instructions and at least one processor. The at least one processor is configured to perform/execute the computer program instructions. When the computer program instructions are performed, they cause the apparatus to: cause rendering of mediated reality content to a user, wherein the mediated reality content comprises virtual visual content rendered on a display of a hovering drone; monitor an orientation of a user's real point of view, over a period of time, while the virtual visual content is rendered on the display of the hovering drone; determine at least one rate of change, over the period of time, of the orientation of the user's real point of view; and cause a distance between a real location of the hovering drone and a real location of the user to reduce based, at least in part, on the determined rate of change.

According to various, but not necessarily all, embodiments there is provided a method. The method comprises causing rendering of mediated reality content to a user. The mediated reality content comprises virtual visual content rendered on a display of a hovering drone. The method comprises monitoring an orientation of a user's real point of view, over a period of time, while the virtual visual content is rendered on the display of the hovering drone. The method also comprises determining at least one rate of change, over the period of time, of the orientation of the user's real point of view. The method further comprises causing a distance between a real location of the hovering drone and a real location of the user to reduce based, at least in part, on the determined rate of change.

According to various, but not necessarily all, embodiments there is provided computer program instructions. The computer program instructions, when performed by one or more processors, cause the one or more processors to perform at least: causing rendering of mediated reality content to a user, wherein the mediated reality content comprises virtual visual content rendered on a display of a hovering drone; monitoring an orientation of a user's real point of view, over a period of time, while the virtual visual content is rendered on the display of the hovering drone; determining at least one rate of change, over the period of time, of the orientation of the user's real point of view; and causing a distance between a real location of the hovering drone and a real location of the user to reduce based, at least in part, on the determined rate of change.

According to various, but not necessarily all, embodiments there is provided an apparatus, comprising means for: mapping a virtual space, defined by mediated reality content, to a real space; causing rendering of the mediated reality content to a user, wherein the mediated reality content comprises virtual visual content rendered on a display of a hovering drone; associating a user's real location in the real space with a virtual location of the user in the virtual space, such that a change in the user's real location causes a corresponding change in the user's virtual location; determining a real location of the user in real space; causing dynamic adjustment of a real location of the hovering drone, relative to the determined real location of the user, while virtual visual content is rendered on the display of the hovering drone; determining that an obstacle will impede movement of the hovering drone if an adjustment is made to move the real location of the hovering drone from a first real location to a second real location; and deciding to remap the virtual space to real space instead of moving the hovering drone to the second location.

According to various, but not necessarily all, embodiments there is provided an apparatus comprising memory storing computer program instructions and at least one processor. The at least one processor is configured to perform/execute the computer program instructions. When the computer program instructions are performed, they cause the apparatus to: map a virtual space, defined by mediated reality content, to a real space; cause rendering of the mediated reality content to a user, wherein the mediated reality content comprises virtual visual content rendered on a display of a hovering drone; associate a user's real location in the real space with a virtual location of the user in the virtual space, such that a change in the user's real location causes a corresponding change in the user's virtual location; determine a real location of the user in real space; cause dynamic adjustment of a real location of the hovering drone, relative to the determined real location of the user, while virtual visual content is rendered on the display of the hovering drone; determine that an obstacle will impede movement of the hovering drone if an adjustment is made to move the real location of the hovering drone from a first real location to a second real location; and decide to remap the virtual space to real space instead of moving the hovering drone to the second location.

According to various, but not necessarily all, embodiments there is provided a method, comprising: mapping a virtual space, defined by mediated reality content, to a real space; causing rendering of the mediated reality content to a user, wherein the mediated reality content comprises virtual visual content rendered on a display of a hovering drone; associating a user's real location in the real space with a virtual location of the user in the virtual space, such that a change in the user's real location causes a corresponding change in the user's virtual location; determining a real location of the user in real space; causing dynamic adjustment of a real location of the hovering drone, relative to the determined real location of the user, while virtual visual content is rendered on the display of the hovering drone; determining that an obstacle will impede movement of the hovering drone if an adjustment is made to move the real location of the hovering drone from a first real location to a second real location; and deciding to remap the virtual space to real space instead of moving the hovering drone to the second location.

According to various, but not necessarily all, embodiments there is provided computer program instructions. The computer program instructions, when performed by one or more processors, cause the one or more processors to perform at least: mapping a virtual space, defined by mediated reality content, to a real space; causing rendering of the mediated reality content to a user, wherein the mediated reality content comprises virtual visual content rendered on a display of a hovering drone; associating a user's real location in the real space with a virtual location of the user in the virtual space, such that a change in the user's real location causes a corresponding change in the user's virtual location; determining a real location of the user in real space; causing dynamic adjustment of a real location of the hovering drone, relative to the determined real location of the user, while virtual visual content is rendered on the display of the hovering drone; determining that an obstacle will impede movement of the hovering drone if an adjustment is made to move the real location of the hovering drone from a first real location to a second real location; and deciding to remap the virtual space to real space instead of moving the hovering drone to the second location.

According to various, but not necessarily all, embodiments there is provided examples as claimed in the appended claims.

BRIEF DESCRIPTION

Some example embodiments will now be described with reference to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

Figure 4:
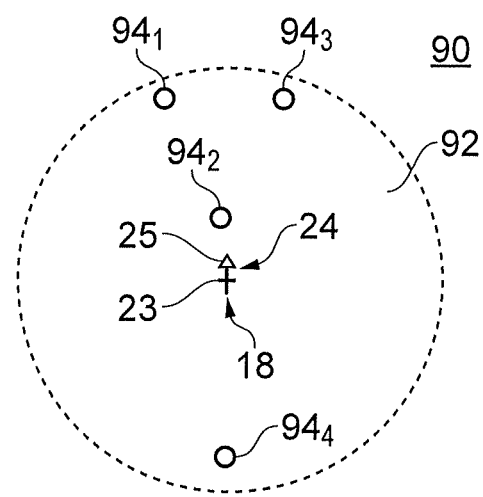
FIG. 4 illustrates, from a top perspective, an example of a virtual aural space 90 that corresponds to the virtual visual space.

DEFINITIONS a "point of view" is a perspective from a particular location and a particular orientation in space;

an "artificial environment" may be something that has been recorded or generated;

a "virtual visual space" refers to a fully or partially artificial environment that may be viewed, which may be three dimensional;

a "virtual visual scene" refers to a representation of the virtual visual space viewed from a particular point of view within the virtual visual space;

"virtual visual object" is a visible virtual object within a virtual visual scene;

an "aural space" (or "virtual aural space") refers to an arrangement of audio sources in a three-dimensional space. A virtual aural space may be defined in relation to recording sounds (a recorded virtual aural space) and in relation to rendering sounds (a rendered virtual aural space);

an "aural scene" (or "virtual aural scene") refers to a representation of the virtual aural space listened to from a particular point of view within the virtual aural space;

an "aural object" refers to an audio source that may be located within the virtual aural space. A source audio object represents an audio source within the virtual aural space, in contrast to an audio source associated with an object in the virtual visual space. A recorded aural object represents sounds recorded at a particular microphone or position. A rendered aural object represents sounds rendered from a particular position;

"virtual space" may mean a virtual visual space, mean a virtual aural space or mean a combination of a virtual visual space and corresponding virtual aural space. In some examples, the virtual space may extend horizontally up to 360° and may extend vertically up to 180°;

"virtual scene" may mean a virtual visual scene, mean a virtual aural scene or mean a combination of a virtual visual scene and corresponding virtual aural scene;

a "virtual object" is an object within a virtual scene, it may be an artificial virtual object (e.g. a computer-generated virtual object) or it may be an image of a real object in a real space that is live or recorded. It may be a virtual aural object and/or a virtual visual object;

a "virtual position" is a position within a virtual space. It may be defined using a virtual location and/or a virtual orientation. It may be considered to be a movable 'point of view'.

"correspondence" or "corresponding" when used in relation to a virtual aural space and a virtual visual space means that the virtual aural space and virtual visual space are time and space aligned, that is they are the same space at the same time;

"correspondence" or "corresponding" when used in relation to a virtual aural scene and a virtual visual scene (or visual scene) means that the virtual aural space and virtual visual space (or visual scene) are corresponding and a notional (virtual) listener whose point of view defines the virtual aural scene and a notional (virtual) viewer whose point of view defines the virtual visual scene (or visual scene) are at the same location and orientation, that is they have the same point of view (same virtual position);

"real space" (or "physical space") refers to a real environment, which may be three dimensional;

"real scene" refers to a representation of the real space from a particular point of view within the real space;

"real visual scene" refers to a representation of the real space viewed from a particular point of view within the real space;

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user;

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects;

"mediated reality content" is content which enables a user to experience a fully or partially artificial environment (a virtual space) as a virtual scene. Mediated reality content could include interactive content such as a video game or non-interactive content such as motion video;

"virtual visual content" is content which enables a user to visually experience a fully or partially artificial environment (a virtual space) as a virtual visual scene;

"virtual aural content" is content which enables a user to aurally experience a fully or partially artificial environment (a virtual space) as a virtual aural scene;

"augmented reality content" is a form of mediated reality content which enables a user to experience a partially artificial environment (a virtual space) as a virtual scene. Augmented reality content could include interactive content such as a video game or non-interactive content such as motion video;

"virtual reality content" is a form of mediated reality content which enables a user to visually experience a fully artificial environment (a virtual space) as at least virtual visual scene, and possibly both a virtual visual scene and a virtual aural scene. Virtual reality content could include interactive content such as a video game or non-interactive content such as motion video;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view (location and/or orientation) determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user. "rendering" means providing in a form that is perceived by the user;

"notional listener" defines the point of view in virtual space used to generate a perspective-mediated virtual aural scene, irrespective of whether or not a user is actually listening; and "notional viewer" defines the point of view in virtual space used to generate a perspective-mediated visual scene, irrespective of whether or not a user is actually viewing.

DETAILED DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual visual objects 21, however, each FIG illustrates a different virtual point of view 24 of a user. The virtual location 23 and virtual direction 25 of a virtual point of view 24 of the user can change independently. The direction 25 but not the location 23 of the virtual point of view 24 of the user changes from FIG. 1A to FIG. 1B. The direction 25 and the location 23 of the virtual point of view 24 of the user changes from FIG. 1B to FIG. 1C.

FIGS. 2A, 2B, 2C illustrate a virtual visual scene 22 from the perspective of the different virtual points of view 24 of the user of respective FIGS. 1A, 1B, 1C. The virtual visual scene 22 is determined by the virtual point of view 24 of the user within the virtual visual space 20 and a field of view 26. The virtual visual scene 22 is at least partially displayed to the user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual (visual) object 21 such as a visual element 28 within the virtual visual space 20. For example, the user may be able to select and move the virtual object 21.

The mediated reality, augmented reality or virtual reality may be perspective-mediated. In this case, user actions determine the virtual point of view 24 of the user within the virtual visual space 20, changing the virtual visual scene 22. For example, as illustrated in FIGS. 1A, 1B, 1C a virtual location 23 of the virtual point of view 24 of the user within the virtual visual space 20 may be changed and/or a direction or orientation 25 of the virtual point of view 24 of the user 18 within the virtual visual space 20 may be changed. If the virtual visual space 20 is three-dimensional, the virtual location 23 of the virtual point of view 24 of the user has three degrees of freedom (e.g. up/down, forward/back, left/right; otherwise known as heave, surge and sway) and the direction 25 of the virtual point of view 24 of the user within the virtual visual space 20 has three degrees of freedom (e.g. roll, pitch, yaw). The virtual point of view 24 of the user may be continuously variable in virtual location 23 and/or direction 25 and user action then changes the location and/or direction of the virtual point of view 24 of the user continuously. Alternatively, the virtual point of view 24 of the user may have discrete quantised locations 23 and/or discrete quantised directions 25 and user action switches by discretely jumping between the allowed locations 23 and/or directions 25 of the virtual point of view 24 of the user.

FIG. 3A illustrates an example of a real space 10 comprising real objects 11 that partially correspond with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a point of view 14 corresponding to the virtual point of view 24 of the user in the virtual visual space 20 of FIG. 1A. The real visual scene content is determined by that corresponding virtual point of view 24 of the user and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to the user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single virtual point of view 24 of the user or on multiple images from different points of view at the same time, processed to generate an image from a single virtual point of view 24 of the user.

In augmented reality, the virtual content 28 is one or more virtual (visual) objects 21. The virtual scene 22 comprises the real scene 12, augmented or not by virtual content in dependence upon the virtual point of view 24 of the user 18.

In virtual reality, the virtual content 28 is the whole of the virtual scene and all virtual objects 21 within it. The virtual scene 22 comprises only the virtual content 28 determined in dependence upon the virtual point of view 24 of the user.

FIG. 4 illustrates, from a top perspective, an example of a virtual aural space 90 that corresponds to the virtual visual space 20. FIG. 4 is a two-dimensional projection or cross-section of the three-dimensional virtual aural space 90. The virtual aural space 90 defines a virtual aural scene 92.

In some but not necessarily all examples, the virtual visual space 20 and the virtual aural space 90 may be corresponding and form a combined virtual space 90, 20. "Correspondence" or "corresponding" when used in relation to a virtual aural space and a virtual visual space means that the virtual aural space 90 and virtual visual space 20 are time and space aligned as combined virtual space 90, 20, that is they are the same space at the same time.

The correspondence between virtual visual space 20 and virtual aural space 90 results in correspondence between the virtual visual scene 22 and the virtual aural scene 92 to form a combined virtual scene 92, 22. "Correspondence" or "corresponding" when used in relation to a virtual aural scene 92 and a virtual visual scene 22 means that the virtual aural space 90 and virtual visual space 20 are corresponding and a notional listener (user) whose point of view defines the virtual aural scene 92 and a notional viewer (user) whose point of view defines the virtual visual scene 22 are at the same location and orientation, that is they are the same virtual point of view 24 of the same user.

In FIG. 4, the virtual aural space 90 and the virtual visual space 20 form a combined virtual space 20, 90. The virtual aural space 90 is an arrangement of audio sources 94 in a three-dimensional space. In this example, the virtual aural space 90 is a rendered virtual aural space and the audio sources 94 comprise aural objects.

The virtual aural space 90 defines a virtual aural scene 92 that corresponds to the virtual visual scene 22. The virtual aural scene 92 and the virtual visual scene 22 form a combined virtual scene 22, 92. The virtual aural scene 92 is a representation of the virtual aural space 90 listened to from a particular virtual point of view 24 of the user 18 within the virtual aural space 90. The virtual aural scene 92 is first person perspective-mediated. The user's real point of view 14 determines the virtual point of view 24 within the virtual aural space, changing the virtual aural scene 92.

In this example, the virtual point of view 24 of the user 18 within the virtual aural space 90 corresponds to the virtual point of view 24 of the user 18 within the virtual visual space 20 and the same label is used. The virtual scene 22, 92 is first person perspective-mediated. The user's real point of view 14 determines the virtual point of view 24 within the combined virtual space 20, 92, changing the combined virtual scene 22, 92.

Correspondence in this sense means that there is a one-to-one mapping between the virtual aural space 90 and the virtual visual space 20 such that a position in the virtual aural space 90 has a corresponding position in the virtual visual space 20 and a position in the virtual visual space 20 has a corresponding position in the virtual aural space 90. Correspondence in this sense means that there is a one-toone mapping between the virtual aural scene 92 and the virtual visual scene 22 such that a position in the virtual aural scene 92 has a corresponding position in the virtual visual scene 22 and a position in the virtual visual scene 22 has a corresponding position in the virtual aural scene 92. Corresponding also means that the coordinate system of the virtual aural space 90/virtual aural scene 92 and the coordinate system of the virtual visual space 20/virtual visual scene 22 are in register such that an object is positioned as an aural object in the virtual aural scene and as a visual object in the visual scene at the same common position from the perspective of the user 18.

In this illustrated example, the user actions determine the virtual point of view 24 of the user 18 within the virtual aural space 90 (and virtual visual space 20), changing the virtual aural scene 92 and the virtual visual scene 22 simultaneously. For example, a virtual location 23 of the virtual point of view 24 of the user 18 within the virtual space 92, 20 may be changed and/or a direction or orientation 25 of the virtual point of view 24 of the user 18 within the virtual space 92, 20 may be changed. If the virtual space 92, 20 is three-dimensional, the virtual location 23 of the virtual point of view 24 of the user 18 has three degrees of freedom e.g. up/down, forward/back, left/right and the direction 25 of the virtual point of view 24 of the user 18 within the virtual visual space 20 has three degrees of freedom e.g. roll, pitch, yaw. The virtual point of view 24 of the user 18 may be continuously variable in virtual location 23 and/or direction 25 and user action then changes the location and/or direction of the virtual point of view 24 of the user 18 continuously. Alternatively, the virtual point of view 24 of the user 18 may have discrete quantised locations 23 and/or discrete quantised directions 25 and user action switches by discretely jumping between the allowed locations 23 and/or directions 25 of the virtual point of view 24 of the user.

The functionality that enables control of a virtual visual space 20 and the virtual visual scene 26 dependent upon the virtual visual space 20 and the functionality that enables control of a virtual aural space and the virtual aural scene 92 dependent upon the virtual aural space 90 may be provided by the same apparatus, system, method or computer program.

Figure 5:
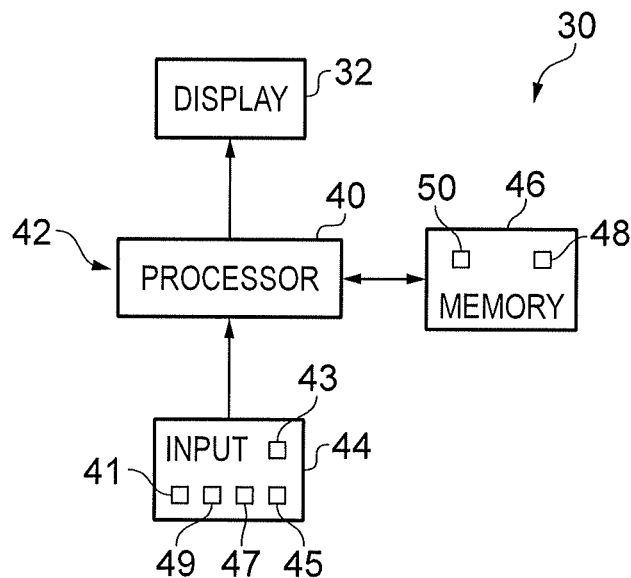
FIG. 5 illustrates an example of an apparatus that is operable to enable mediated reality and/or augmented reality and/or virtual reality.

FIG. 5 illustrates an example of an apparatus 30 that is operable to enable mediated reality and/or augmented reality and/or virtual reality.

The apparatus 30 comprises a rendering device or devices 32, which may render information to a user visually via a display, aurally via one or more audio outputs 32, for example via loudspeakers, and/or haptically via a haptic device.

The audio output device 32 may comprise one or more spatially distributed audio sources. For example, binaural loudspeakers may be separated in a head mounted audio (HMA) device, loudspeakers may be spatially separated in a sound bar or in a distributed loudspeaker arrangement e.g. 5.1 or 7.1 surround sound.

The display 32 is for providing at least parts of the virtual visual scene 22 to a user 18 in a form that is perceived visually by the user 18. The display 32 may be a visual display that provides light which displays at least parts of the virtual visual scene 22 to a user 18. Examples of visual displays include liquid crystal displays, organic light emitting displays, emissive, reflective, transmissive and transflective displays, direct retina projection display, near eye displays etc.

The rendering device or devices 32 are controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 5 the controller 42 may comprise at least one processor 40 configured to load computer program instructions 48 from at least one memory 46. The controller 42 may be implemented using instructions that enable hardware functionality, for example, by using executable computer program instructions 48 in a general-purpose or special-purpose processor 40 that may be stored on a computer readable storage medium (disk, memory etc.) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 6A & 6B. The processor 40 by reading the memory 46 is able to load and execute the computer program 48.

The apparatus 30 may enable user-interactive mediation for mediated reality and/or augmented reality and/or virtual reality. The input circuitry 44 tracks (detects over time) user actions using user input 43. These user actions are used by the controller 42 to determine what happens within the virtual space 20, 90. This may enable interaction with a visual element 28 within the virtual visual space 20.

The apparatus 30 may enable perspective mediation for mediated reality and/or augmented reality and/or virtual reality. The input circuitry 44 tracks (detects over time) user actions. These user actions are used by the controller 42 to determine the virtual point of view 24 of the user 18 within the virtual space, changing the virtual scene. The virtual point of view 24 of the user 18 may be continuously variable in location and/or direction and user action changes the location and/or direction of the virtual point of view 24 of the user 18. Alternatively, the virtual point of view 24 of the user 18 may have discrete quantised locations and/or discrete quantised directions and user action switches by jumping to the next location and/or direction of the virtual point of view 24 of the user 18.

The apparatus 30 may enable first person perspective for mediated reality, augmented reality or virtual reality. The input circuitry 44 detects the user's real point of view 14 using one or more point of view sensors 45. The user's real point of view is used by the controller 42 to determine his virtual point of view 24 within the virtual space 20, 90, changing the virtual scene 22, 92. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or viewpoint and/or a user changing a direction of their gaze.

The one or more point of view sensors 45 are configured to determine changes in the user's real point of view 14.

For example, positioning technology such as GPS (Global Positioning System), HAIP (high-accuracy indoor positioning), triangulation (trilateration) by transmitting to multiple receivers and/or receiving from multiple transmitters, acceleration detection and integration may be used to determine a new physical location 13 of the user 18 and real point of view 14.

For example, one or more motion sensors (such as one or more accelerometers, electronic gyroscopes, electronic compasses and/or one or more image sensors) may be used to determine a change in an orientation of a user's head or viewpoint (roll, pitch and yaw) and a consequential change in the real direction 15 of the real point of view 14.

Pupil tracking technology, based for example on computer vision, may for example be used to track movement of a user's eye or eyes and therefore determine a direction of a user's gaze and consequential changes in the real direction 15 of the real point of view 14.

The apparatus 30 may comprise as part of the input circuitry 44 one or more image sensors 47 for imaging the real space 10 that are part of or different from the point of view sensor(s) 45.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with structured light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
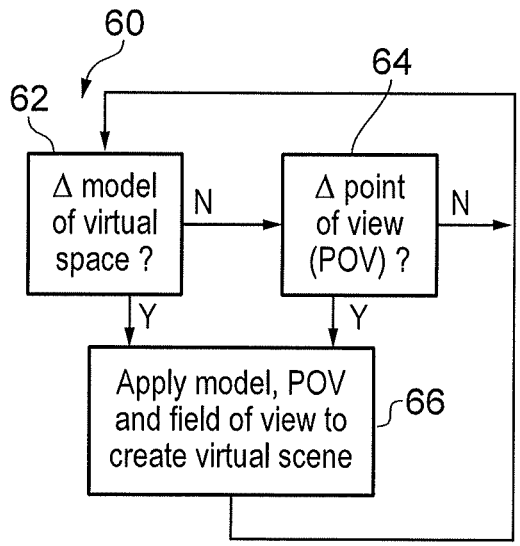
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The controller 42 stores and maintains a model 50 of the virtual space 20 including a mapping between the physical space 10 and the virtual space 10.

The model may be provided to the controller 42 or determined by the controller 42. For example, sensors in input circuitry 44 may optionally be used to create overlapping depth maps of the real space from different points of view, virtual content is added, to produce and change the model.

Each real location 13 in the physical space 10, through the mapping, has a corresponding virtual location 23 in the virtual space 20 and vice versa. Each real orientation 15 in the physical space 10, through the mapping, has a corresponding virtual orientation 25 in the virtual space 20 and vice versa.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a location of the object.

At block 62 it is determined whether or not the model of the virtual space 20 has changed. If the model of the virtual visual space 20 has changed the method moves to block 66. If the model of the virtual visual space 20 has not changed the method moves to block 64.

At block 64 it is determined whether or not the virtual point of view 24 of the user 18 in the virtual visual space 20 has changed. If the virtual point of view 24 of the user 18 has changed the method moves to block 66. If the virtual point of view 24 of the user 18 has not changed the method returns to block 62.

At block 66, a two-dimensional projection of the three-dimensional virtual visual space 20 is taken from the virtual location 23 and in the direction 25 defined by the current virtual point of view 24 of the user 18. The projection is limited by the field of view 26 to produce the virtual visual scene 22. The projection may also define the virtual aural scene 92. The method then returns to block 62.

Figure 6B:
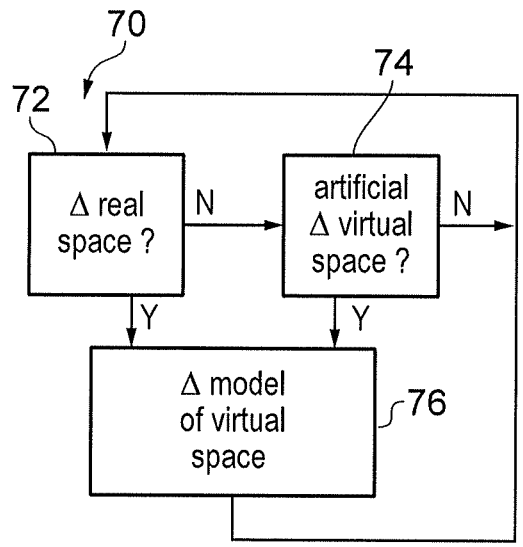
FIG. 6B illustrates an example of a method for updating a model of the virtual visual space for augmented reality.

FIG. 6B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in FIGS. 6A & 6B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Figure 7:
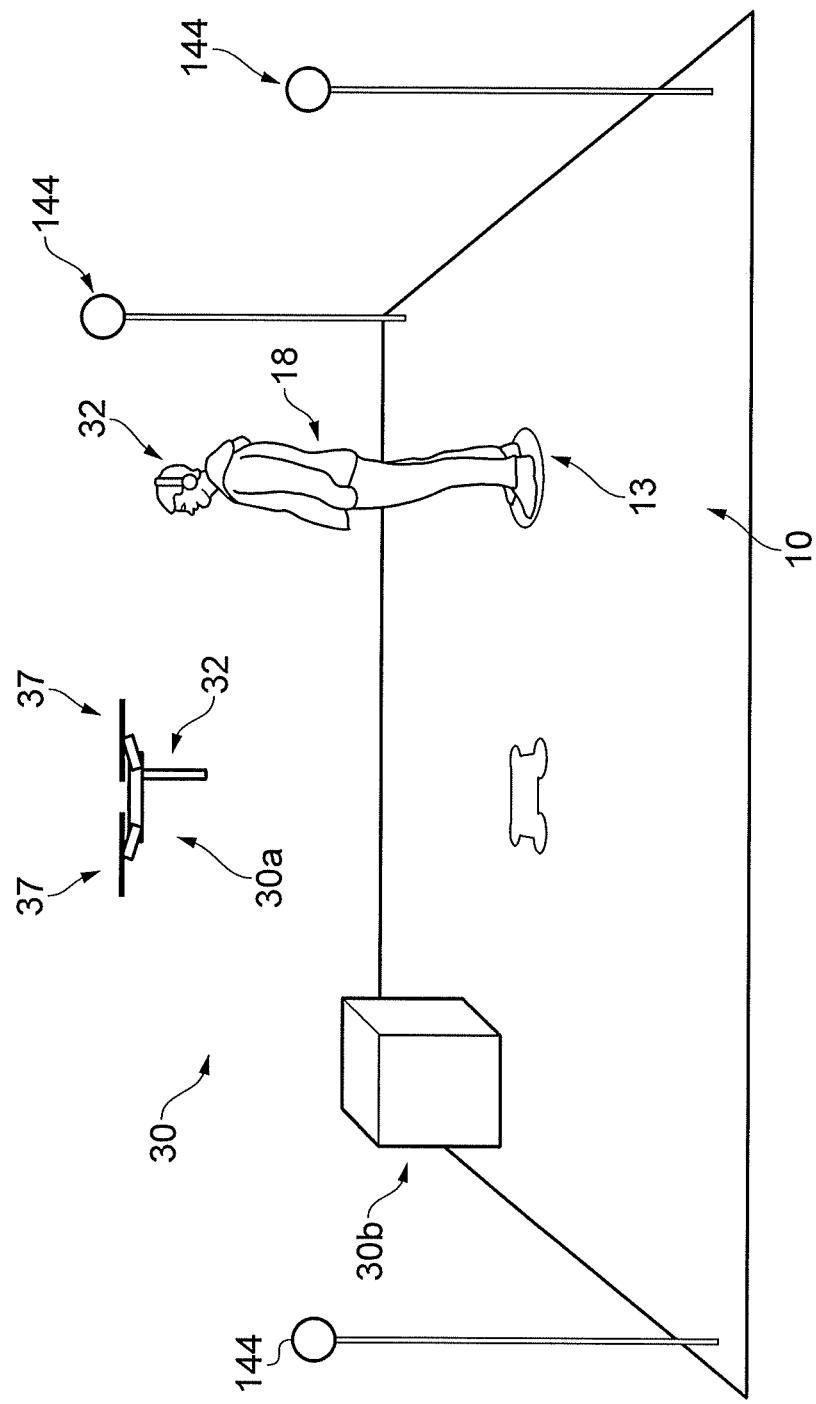
FIG. 7 illustrates an example in which the apparatus of FIG. 5 is provided by a combination of a server, a hovering drone and distributed upstanding sensors.

FIG. 7 illustrates an example of the apparatus 30 of FIG. 5 that enables display of at least parts of the virtual visual scene 22 to a user and rendering of audio to a user. In this regard, the apparatus 30 is configured to enable a user to experience mediated reality content, such as virtual reality content or augmented reality content.

In the example illustrated in FIG. 7, the apparatus 30 comprises a hovering drone 30a, a server 30b, a head mounted audio device (headphones) 32 and a plurality of distributed upstanding sensors 144 that is separate from the hovering drone 30a and the server 30b.

The server 30b might, for example, be a desktop computer, a laptop computer or a different type of hand portable electronic device such as a mobile telephone or a tablet computer.

The distributed upstanding sensors 144 might include at least a portion of the input circuitry 44 of the apparatus 30 such as at least a portion of the user input circuitry 43 and the point of view sensor(s) 45. As such, the distributed upstanding sensors 144 are considered to be an example of at least a portion of the input circuitry 44 described above in relation to FIG. 5. The communication circuitry 41 might be distributed around the hovering drone 30a, the server 30b and the distributed upstanding sensors 144. The communication circuitry 41 may be configured to enable wired or wireless communication between the server 30b and the distributed sensors 144 and configured to enable wired or wireless communication between the server 30b and the hovering drone 30a.

The at least one processor 40, the at least one memory 46, the computer program instructions 48 and/or the model 50 might be provided in the server 30b, in the hovering drone 30a or distributed across the server 30b and the hovering drone 30a. In some examples, the server 30b comprises at least one processor 40 and at least one memory 48 which performs the functionality described above in relation to FIGS. 6A and/or 6B and uses the communication circuitry 41 to cause one or more displays 32 of the hovering drone 32 and one or more audio rendering devices 32 to render the output to the user 18. All, some or none of the audio rendering devices 32 could be mounted on the hovering drone 32. In the illustrated example, the audio rendering device is a head mounted audio device 32 that is separate from the hovering drone 30a and the server 30b.

The one or more displays 32 of the hovering drone 30a might or might not be touch sensitive. In this regard, the hovering drone 30a might include at least some of the user input circuitry 43 mentioned above. Other user input circuitry 43, such as that for detecting non-touch user gestures, might also be provided by the hovering drone 30a.

In other examples, there is no server 30b. In these examples, the hovering drone 30a comprises at least one processor 40 and at least one memory 48 which performs the functionality described above in relation to FIGS. 6A and/or 6B and controls one or more displays 32 of the hovering drone 32 and one or more audio rendering devices 32 to render the output to the user 18. As in the previous example, all, some or none of the audio rendering devices 32 could be mounted on the hovering drone 30a.

At least one processor 40 of the apparatus 30 (in the hovering drone 30a or the server 30b) may be configured to determine the real location 13 of the user 18, and to dynamically adjust the real location (of the display 32) of the hovering drone 30a based on the determined real location 13 of the user 18. The real location 13 of the user may be determined by the one or more processors 40 based on inputs from the distributed upstanding sensors 144.

The processor 40 might be configured to determine the real point of view 14 of the user 18 (including determining the real location 13 of the user 18 and the direction/ orientation of the user's real point of view 14), and to dynamically adjust the real location and the real orientation (of the display 32) of the hovering drone 30a based on the determined real point of view 14 of the user 18. The user's real point of view 14 may be determined by the one or more processors 40 based on inputs from the distributed upstanding sensors 144.

The purpose of dynamically adjusting the real location of (the display 32 of) the hovering drone 30a is to enable the user 18 to experience mediated reality. In this regard, the display 32 of the hovering drone 30a might be adjusted such that the surface of the display 32 is aligned with the user's real point of view 14 and visible to the user 18.

Keeping the hovering drone 30a airborne might generate a noise that is audible to the user 18 which is not insignificant to the user's mediated reality experience, depending on the distance between the real location 13 of the user 18 and the real location of the hovering drone 30a. It might be intrusive to the user's mediated reality experience. A reduction in the distance between the real location of the hovering drone 30a and the real location 13 of the user 18 increases the loudness of the noise, due to reduced sound wave attenuation. An increase in the distance between the real location of the hovering drone 30a and the real location 13 of the user 18 reduces the loudness of the noise, due to increased sound wave attenuation.

Figure 8A:
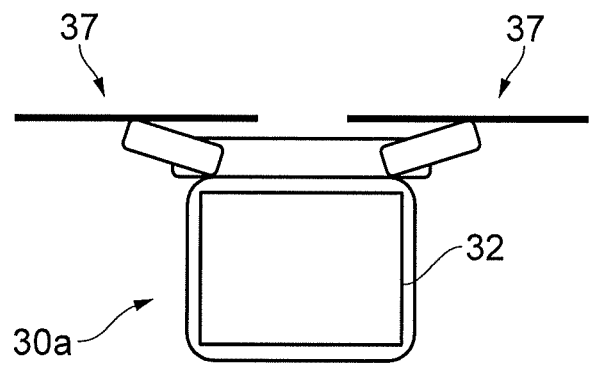
FIGS. 8A, 8B and 8C illustrate front, plan and side views of the hovering drone.
Figure 8B:
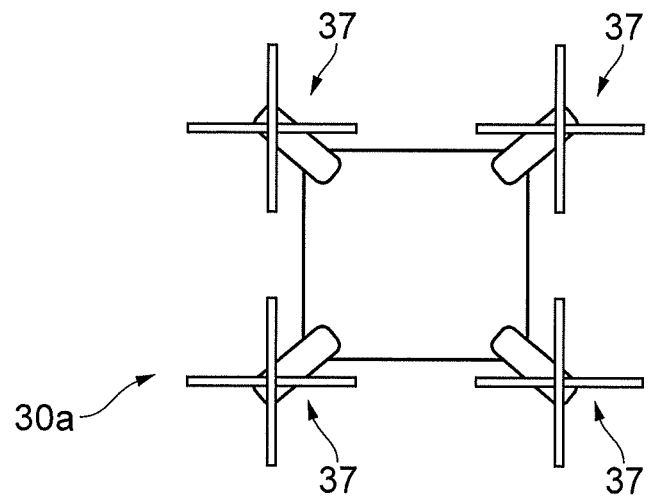
Figure 8C:
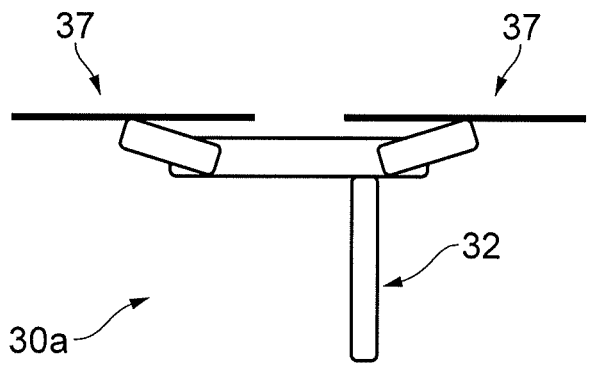

FIGS. 8A, 8B and 8C illustrate front, plan and side views of an example of the hovering drone 30a. The figures illustrate the display 32 of the hovering drone 30a. The hovering drone 30a also comprises means 37 for enabling the hovering drone to move and hover. That means 37 might, for example, include one or more motors (such as one or more electric motors) that are configured to drive one or more propellers.

Figure 9A:
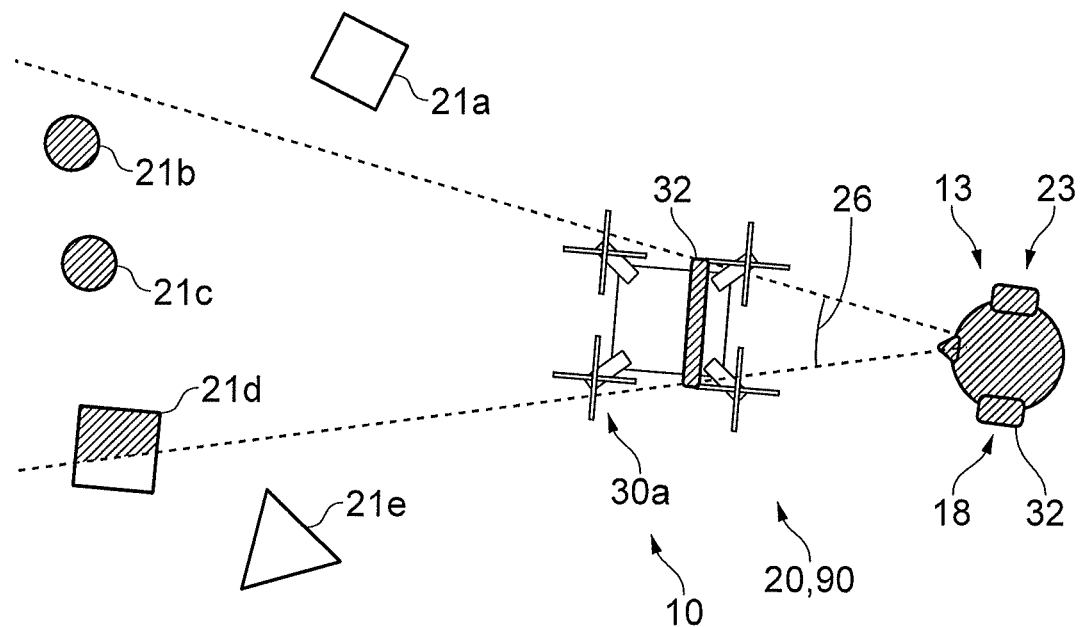
FIG. 9A illustrates a schematic plan view of a user experiencing mediated reality by viewing virtual visual content on a display of the hovering drone.

FIG. 9A illustrates a schematic plan view of the user 18 experiencing mediated reality by viewing virtual visual content on the display 32 of the hovering drone 30a. FIG. 9A is a schematic that illustrates some real objects in real space 10 in the form of the user 18 and the hovering drone 30a, and some visual virtual content in virtual space 20, 90 including virtual objects 21a-21e.

Figure 9B:
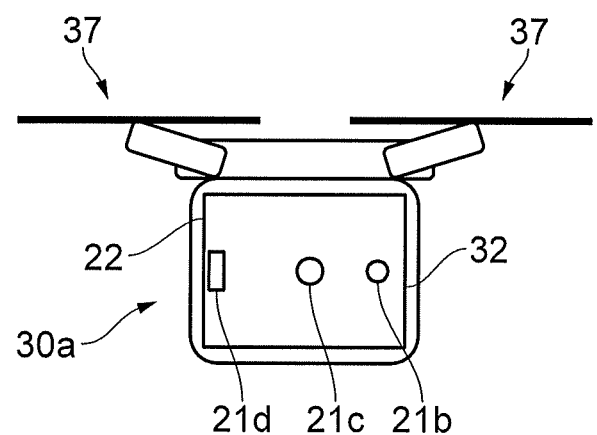
FIG. 9B illustrates the visual virtual content being displayed by the display of the hovering drone in FIG. 9A.

FIG. 9B illustrates the visual virtual content being displayed by the display 32 of the hovering drone 30a in FIG. 9A. As explained above, virtual space 20, 90 is mapped to real space 10 by the processor 30. The visual virtual scene 22 that is displayed by the display 32 of the hovering drone 30a depends upon the real location of the hovering drone 30a. While the visual virtual content includes five virtual objects 21a-21e in FIG. 9A, only three are at least partially displayed on the display 32 of the hovering drone 30a, as shown in FIG. 9B.

Figure 10A:
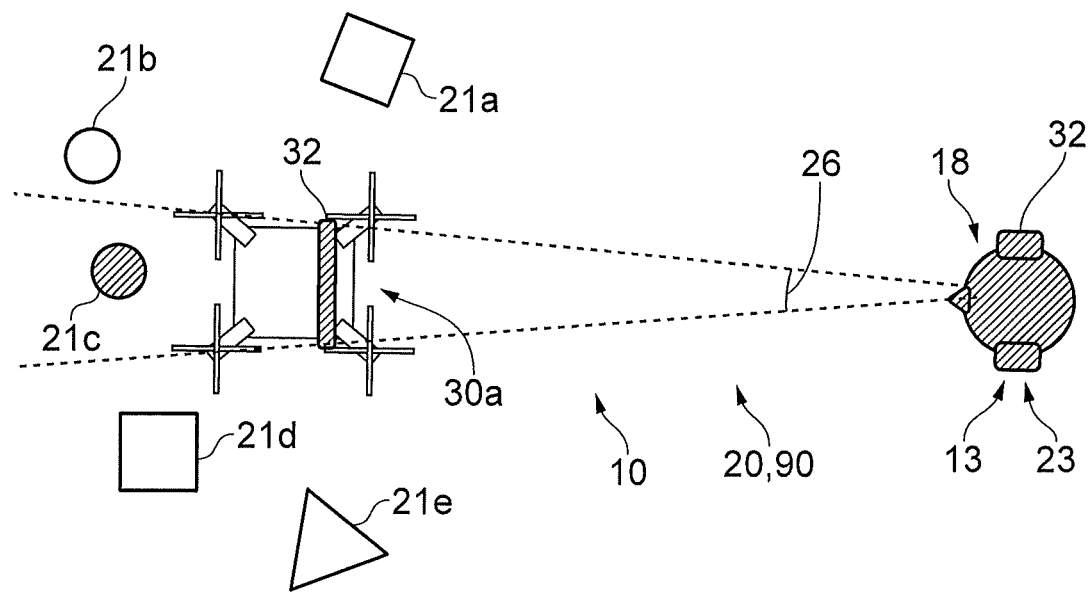
FIG. 10A illustrates a schematic plan view of a user experiencing mediated reality by viewing virtual visual content on the display of the hovering drone, where the real location of the hovering drone has changed relative to FIG. 9A.

FIG. 10A illustrates a schematic plan view of the user 18 continuing to experience mediated reality by viewing virtual visual content on the display 32 of the hovering drone 30a. However, in FIG. 10A the real distance between the hovering drone 30a and the user 18 has changed; it is greater than in FIG. 9A. In the example illustrated in FIG. 10A, the real location of the hovering drone 30a has changed but the real location of the user 18 has not changed.

Figure 10B:
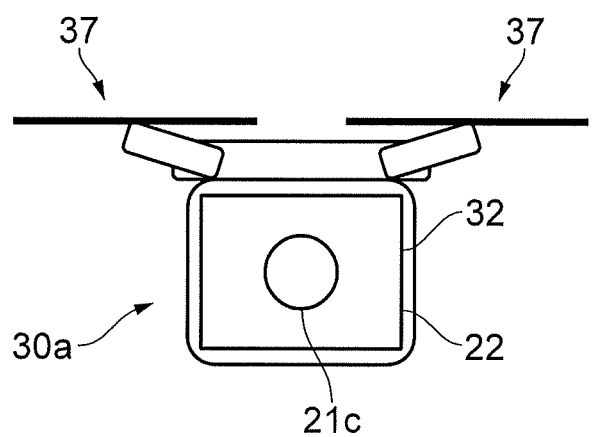
FIG. 10B illustrates the visual virtual content being displayed by the display of the hovering drone in FIG. 10A.

FIG. 10B illustrates the visual virtual content being displayed by the display 32 of the hovering drone 30a in FIG. 10A. As the visual virtual scene 22 that is displayed by the hovering drone 30a depends upon the real location of the hovering drone 30a, it has changed in FIG. 10B. In FIG. 10B, the displayed visual virtual content only includes a single virtual object 21c; the other virtual objects 21a, 21b, 21d, 21e are not displayed.

Figure 11:
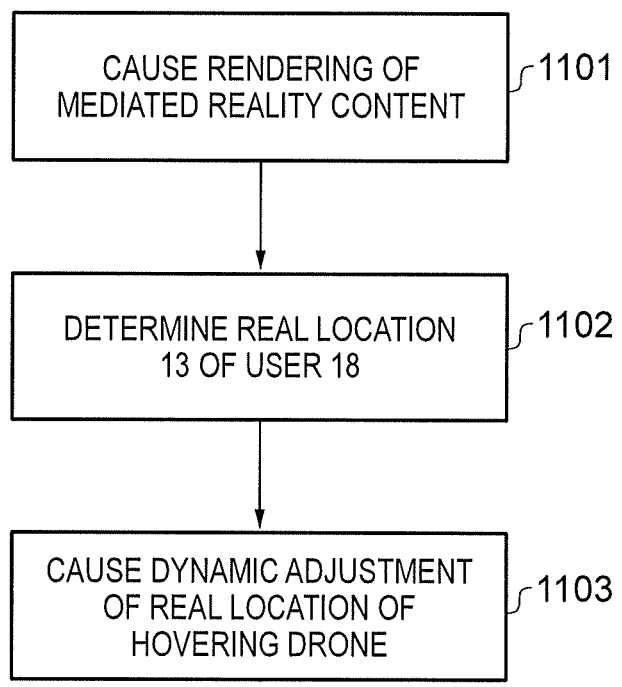
FIG. 11 illustrates a block diagram of a method.

FIG. 11 illustrates a flow chart of a method according to embodiments of the invention. In block 1101 of FIG. 11, the one or more processors 40 of the apparatus 30, under the operation of the computer program instructions 48, cause rendering of mediated reality content to the user 18. The mediated reality content comprises virtual visual content rendered on the display 32 of the hovering drone 30*a*.

In block 1102 of FIG. 11, the one or more processors 40 of the apparatus 30, under the operation of the computer program instructions 48, determine the real location 13 of the user 18, for example by receiving one or more inputs from the input circuitry 44.

In block 1103 of FIG. 11, the one or more processors 40 of the apparatus 30, under the operation of the computer program instructions 48, causes dynamic adjustment of the real location of the hovering drone 30*a*. For example, the one or more processors 40 (located in the hovering drone 30*a*, the server 30*b* or a combination of the two) provide outputs to the means 37 for enabling the drone 30*a* to move and hover in order to adjust the drone's real location.

The method illustrated in FIG. 11 can be performed in conjunction with the methods illustrated in FIGS. 6A and 6B and described above. In some embodiments, the computer program instructions 48 may be configured to cause the one or more processors 30 to cause the hovering drone 30*a* to be located a predefined (default) distance from the real location 13 of the user 18 (determined in block 1102 of FIG. 11) as the mediated reality content is rendered. The display 32 of the hovering drone 30*a* is aligned with the orientation/direction 15 of the real point of view 14 of the user 18. Thus, a change in the point of view 14 of the user 18 (the user's real location 13 or the orientation/direction 15 of the user's point of view 14) causes the one or more processors 40 to change the real location of the (display 32 of the) hovering drone 30*a*.

The one or more processors 30 might also monitor one or more characteristics of the mediated reality content rendered to the user 18. Monitoring one or more characteristics of the mediated reality content might involve monitoring one or more characteristics of virtual visual content, virtual aural content, or both. The dynamic adjustment of the real location of the (display 32 of the) hovering drone 30*a* might also depend on the monitored characteristic(s).

In at least some embodiments of the invention, the one or more processors 40 might monitor the comparative importance of virtual visual content and virtual aural content, and then dynamically adjust the real location of the (display 32 of the) hovering drone 30*a*, relative to the user 18, based at least in part on the (current) comparative importance of the virtual visual content and the virtual aural content. When the one or more processors 30 monitor the "comparative importance" of virtual visual content and virtual aural content, they monitor the importance of the virtual visual content compared with the importance of the virtual aural content.

For example, the mediated reality content might include metadata that defines/indicates the comparative importance of virtual visual content and virtual aural content that are rendered to the user 18 simultaneously. That is, the metadata might indicate that in a given portion of the mediated reality content (at a given time in the mediated reality content) the virtual visual content is more important than the virtual aural content, or the virtual aural content is more important than the virtual visual content, or that they are of the same importance. The metadata is stored in the at least one memory 46. It might form part of the mediated reality content file(s). The metadata can also be received along with a media stream (including the virtual visual content and/or the virtual aural content) if the virtual visual content and/or the virtual aural content is streamed from a network location such as a content delivery server 30*b*.

The comparative importance might change over the duration of the mediated reality content. Sometimes the virtual visual content might be more important than the virtual aural content, sometimes the virtual aural content might be more important than the virtual visual content, and sometimes they might be of the same importance.

The metadata indicating the comparative importance might be predefined by a creator of the mediated reality content. Alternatively, it might be set by a different entity, such as the user 18. Predefined metadata might be user reconfigurable.

Rather than metadata defining the comparative importance of the virtual visual content and the virtual aural content, the comparative importance might instead be indicated by the user 18, such as while the mediated reality content is being rendered to the user 18. For instance, a first user input which is detectable by the user input circuitry 43 might be assigned to indicate that virtual visual content is more important (to the user) at that time/in that given portion of mediated reality content than virtual aural content. A second user input which is detectable by the user input circuitry 43 might be assigned to indicate that virtual aural content is more important (to the user) at that time/in that given portion of mediated reality content than virtual visual content. A third user input which is detectable by the user input circuitry 43 might be assigned to indicate that the importance of virtual visual content and virtual aural content is the same at that time/in that given portion of mediated reality content.

The first, second and third user inputs are different. One, some or all of the first, second and/or third user inputs could be user gesture inputs, for example. The first, second or third user input can be provided while the mediated reality content is being rendered to the user 18.

The one or more processors 40 may be configured to dynamically adjust the distance between the hovering drone 30*a* and the user 18 in accordance with the following equation:

$$d = i(d_{max} - d_{min}) + d_{min}$$

where: i is the relative/comparative importance of virtual aural content versus virtual visual content and ranges from 0 to 1. Thus, when the virtual aural content is of maximal importance the value is 1 and when the virtual visual content is of maximal importance the value is 0. When they are equally important the value is 0.5. $d_{max}$ is a predefined maximum distance between the hovering drone 30*a* and the user 18 and $d_{min}$ is a predefined minimum distance between the hovering drone 30*a* and the user 18.

$d_{min}$ might be a static value that is based on the minimum distance that the hovering drone 30*a* can be safely located from the user 18. $d_{max}$ might be a static value or a variable value. If $d_{max}$ is a variable value, it might depend on real obstacles in real space 10 which could restrict the movement of the hovering drone 30*a*, such as real walls of a room. $d_{max}$ might be different depending on the orientation of the user's point of view 14 and might, for example, be based on the dimensions of a room in which the hovering drone 30*a* is located.

A value of i (for a given portion of mediated reality content) which is around 0.5 indicates that the comparative importance of the virtual visual content and virtual aural content is about the same. A value of i which is 1 or close to 1 indicates that the virtual aural content is much more important than the virtual visual content. A value of i which is 0 or close to 0 indicates that the virtual visual content is much more important than the virtual aural content.

If i=0.5, the distance between the hovering drone 30a and the user 18 is 0.5 $d_{max}$+0.5 $d_{min}$. 0.5 $d_{max}$+0.5 $d_{min}$ might be considered to be the standard/default distance between the hovering drone 30a and the user 18.

If i=1, the distance between the hovering drone 30a and the user 18 is $d_{min}$. If i=0, the distance between the hovering drone 30a and the user 18 is $d_{max}$.

Figure 12A:
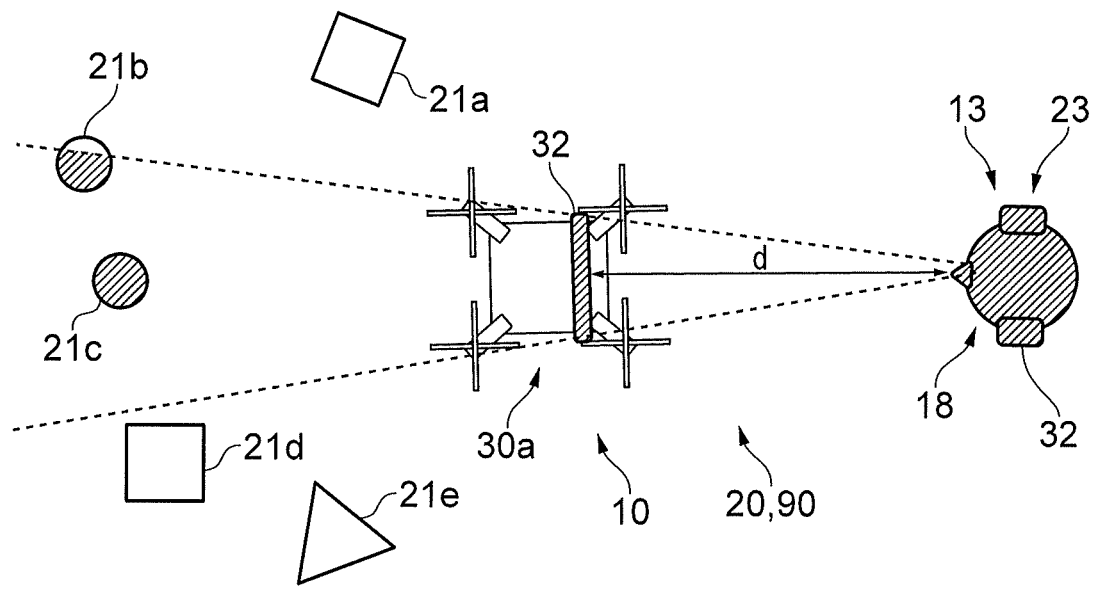
FIG. 12A illustrates a schematic plan view of a user experiencing mediated reality by viewing virtual visual content on a display of the hovering drone, where the real location of the hovering drone is being maintained at a predefined default distance from the user.
Figure 12B:
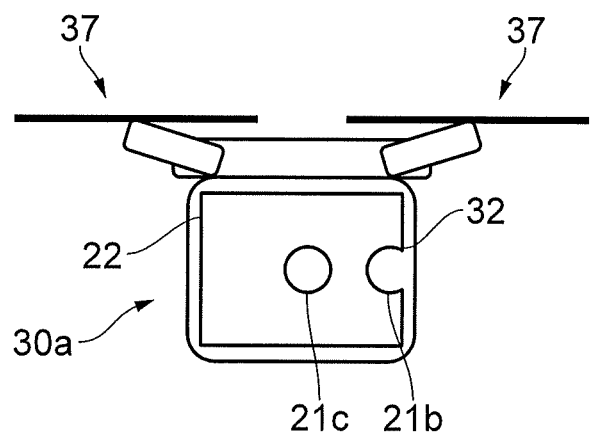
FIG. 12B illustrates the visual virtual content being displayed by the display of the hovering drone in FIG. 12A.

FIG. 12A illustrates a schematic plan view of the user 18 experiencing mediated reality content by viewing virtual visual content on a display 32 of the hovering drone 30a (and by listening to virtual aural content via a head mounted audio device 32). In FIG. 12A, the real location of the hovering drone 30a is being maintained at a predefined default distance from the user 18, which might be 0.5 $d_{max}$+0.5 $d_{min}$. FIG. 12B illustrates the visual virtual content being displayed by the display 32 of the hovering drone 30a in FIG. 12A.

Figure 13A:
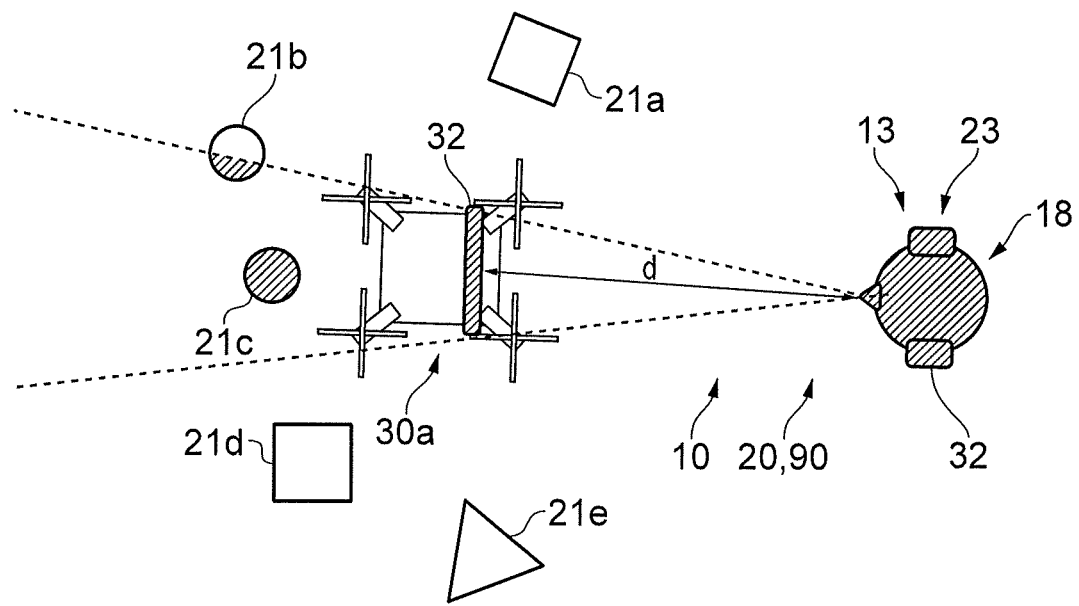
FIG. 13A illustrates a schematic plan view of a user experiencing mediated reality by viewing virtual visual content on the display of the hovering drone, where the real location of the user has changed relative to FIG. 12A and the real location of the hovering drone is being maintained at the predefined default distance from the user.
Figure 13B:
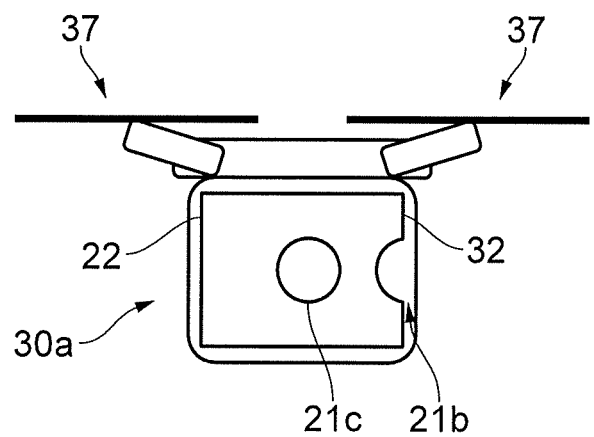
FIG. 13B illustrates the visual virtual content being displayed by the display of the hovering drone in FIG. 13A.

FIG. 13A illustrates a schematic plan view at a later point in time, where the user 18 is continuing to experience the mediated reality content by viewing virtual visual content on the display 32 of the hovering drone 30a. The real location 13 of the user 18 has changed relative to FIG. 12A. As the real location of the user 18 changes, the real location of the hovering drone 30a is being dynamically adjusted under the control of the one or more processors 40 in order to maintain the predefined default distance between the (display 32 of the) hovering drone 30a and the user 18 (for instance, where i=0.5). In this example, the real location of the hovering drone 30a has not been restricted by real objects as the user 18 has moved around in real space 10. FIG. 13B illustrates the visual virtual content being displayed by the display 32 of the hovering drone 30a in FIG. 13A.

Figure 14A:
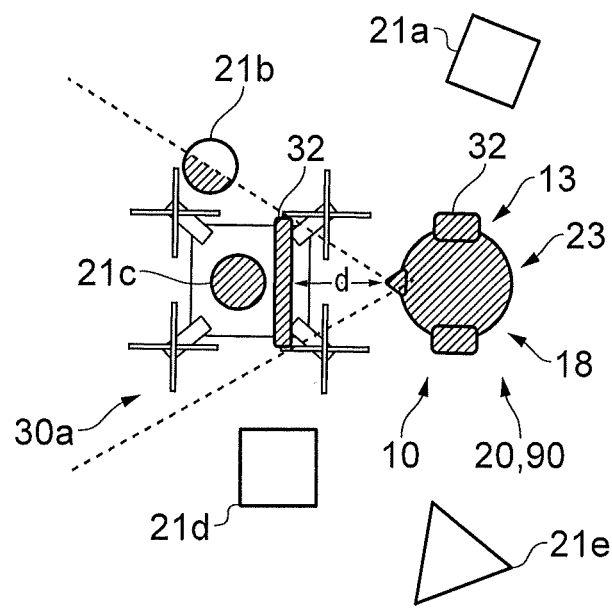
FIG. 14A illustrates a schematic plan view of a user experiencing mediated reality by viewing virtual visual content on the display of the hovering drone, where the real location of the hovering drone is no longer being maintained at the predefined default distance from the user.
Figure 14B:
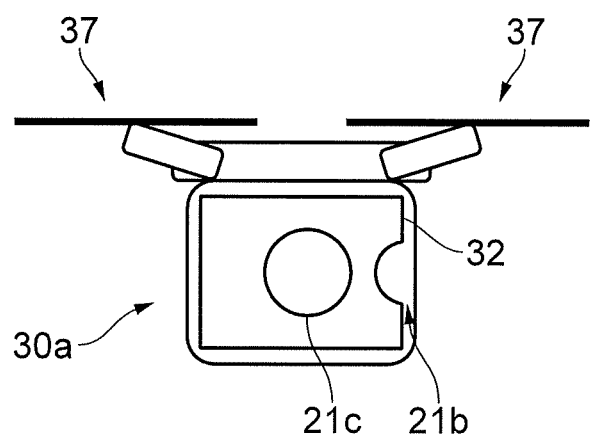
FIG. 14B illustrates the visual virtual content being displayed by the display of the hovering drone in FIG. 14A.

FIGS. 14A and 14B illustrate an example in which the one or more processors 40 have determined that the comparative importance of the virtual visual content of the mediated reality content is greater than that of the virtual aural content of the mediated reality content. The one or more processors 40 might have determined this from metadata or from user input, as described above. After making that determination, the one or more processors 40 cause dynamic adjustment of the real location of the hovering drone 30a, relative to the real location of the user 18.

FIG. 14A illustrates a schematic plan view of a user experiencing mediated reality by viewing the virtual visual content on the display 32 of the hovering drone 30a. FIG. 14B illustrates the visual virtual content being displayed by the display 32 of the hovering drone 30a in FIG. 14A.

If the one or more processors 40 determine that (a given portion of) the virtual visual content is more important than (a given portion of) corresponding (contemporaneous) virtual aural content and control the distance between the hovering drone 30a and the user 18 to reduce (as in FIGS. 14A and 14B), the increased distance potentially provides a better visual experience for the user 18. For example, the user 18 might see the virtual visual content with more clarity than if the hovering drone 30a were further away from him. Also, the user's virtual field of view 26 is greater when the display 32 is closer to the user 18.

The reduced distance between hovering drone 30a might result in a worse aural experience for the user 18 than if the hovering drone 30a were further away from him, due to the noise that is generated by the hovering drone 30a in keeping it airborne and the reduced sound wave attenuation by the air between the drone 30a and the user 18. However, given that either the metadata or the user 18 has indicated that the virtual visual content is more important than the virtual aural content at this time, the tradeoff is considered to be worth making. In some instances, if one or more audio playback devices 32 are co-located with the drone 30a (such as on the drone 30a), the gain/volume of that/those playback devices 32 might be decreased to compensate for the decreased distance as without compensation the audio would get louder. However, in some instances it may be desirable not to decrease the gain/volume and allow the audio played back to become louder (to the user 18) because of the decreasing distance, in order to compensate for the naturally increasing noise volume.

If the one or more processors 40 determine that (a given portion of) the virtual aural content is more important than (a given portion of) corresponding (contemporaneous) virtual visual content and control the distance between the hovering drone 30a and the user 18 to increase (as in FIGS. 14A and 14B), the increased distance potentially provides a better aural experience for the user 18. For example, the loudness of the noise that is generated in keeping the hovering drone 30a airborne is reduced, making it less intrusive to the user's aural experience. The increased distance between hovering drone 30a might result in a worse visual experience for the user 18 than if the hovering drone 30a were closer to him. However, given that either the metadata or the user 18 has indicated that the virtual aural content is more important than the virtual visual content at this time, the tradeoff is considered to be worth making.

In some instances, if one or more audio playback devices 32 are co-located with the drone 30a (such as on the drone 30a), the gain/volume of that/those playback devices 32 might be increase to compensate for the increased distance as without compensation the audio become quieter (to the user 18). However, in some instances it may be desirable not to increase the gain/volume and allow the audio played back to get quieter because of the increasing distance to compensate for the naturally decreasing noise volume.

It was explained above that the one or more processors 40 cause dynamic adjustment of the real location of the hovering drone 30a relative to the real location of the user 18 (for example, by increasing or reducing the distance between them) based at least in part on at least one characteristic of the mediated reality content rendered to the user 18. It was also explained above that the characteristic(s) might include the relative importance of the virtual visual content and the virtual aural content. Alternatively or additionally, the dynamic adjustment of the real location of the hovering drone 30a relative to the real location of the user 18 might be based at least in part on one or more different characteristics of the mediated reality content.

For example, the one or more processors 40 might determine (for example, by analyzing the virtual visual content) whether the user 18 is approaching an interactive virtual visual object provided by the virtual visual content. This might involve determining whether the virtual location 23 of the user 18 is within a predefined virtual distance of the virtual location of the interactive virtual visual object. If it is determined that the user 18 is approaching an interactive virtual visual object provided by the virtual visual content, the one or more processors 40 might cause the real distance between the hovering drone 30a and the user 18 to reduce.

The distance between the hovering drone 30a and the user 18 might be reduced in this type of situation for one or more reasons. For instance:

reducing the distance might enable the user 18 to see the interactive virtual visual object with greater clarity and increase the user's virtual field of view 26;

if at least a part of the user input circuitry 43 is provided by making the display 32 of the hovering drone 30a touch sensitive, then reducing the distance between the hovering drone 30a and the user 18 might position the display 32 of the hovering drone 30a within reaching distance of the user 18, enabling him to provide touch input via the display; and/or if at least a part of the user input circuitry 43 is for detecting non-touch gesture input by the user 18 and is positioned on the hovering drone 30a, reducing the distance between the hovering drone 30a and the user 18 might enable non-touch gesture input from the user 18 to be detected (whereas at a greater distance it could not) or it might enable non-touch gesture input from the user 18 to be detected with a greater accuracy. Improving accuracy of detection might involve improving the precision/resolution at which non-touch gesture input is detected (for example, enabling detection of mere movement of a user's fingers, rather than requiring arm movement) and/or might involve improving the consistency at which particular non-touch gesture input is detected.

In some embodiments of the invention, the one or more processors 40 may determine, while the user 18 is experiencing the mediated reality content, that the user 18 appears to be looking for something in virtual space 20. This might be indicated by the user 18 might changing the orientation of his real point of view 14 quickly (which in turn, changes his virtual point of view 24) and/or by the user 18 looking in multiple different directions over a short period of time.

The one or more processors 40 might monitor the orientation of the user's real point of view 14, over a period of time, while the virtual visual content is rendered on the display 32 of the hovering drone 30a. The one or more processors 40 might determine a rate of change of the user's real point of view 14 and cause dynamic adjustment of the real location of the (display 32 of the) hovering drone 30a relative to the user 18 based, at least in part, on the determined rate of change. For instance, the one or more processors 40 might determine that the rate of change of the user's real point of view 14, over a period of time, exceeds a threshold rate of change and then cause the distance between the real location of the hovering drone 30a and the real allocation 13 to reduce (by adjusting the real location of the hovering drone 30a). This increases the user's virtual field of view 26, enabling the user 18 to search visual space 20 more easily. It also means that less movement of the (display 32 of the) hovering drone 30a is required while the user 18 is searching.

Movement of the hovering drone 30a might be restricted by real obstacles such as walls in some instances. The hovering drone 30a might include one or more proximity sensors that provide inputs to the one or more processors 40. A predefined minimum obstacle distance might be stored in the memory 46 and the one or more processors 40 might use the inputs from the one or more proximity sensors to ensure that the hovering drone 30a is always located at least the predefined minimum obstacle distance from real objects/obstacles/walls. Alternatively or additionally, the one or more processors 40 might analyze a map of real space 10 indicating positions of real obstacles and control movement of the hovering drone 30a to ensure that the hovering drone 30a is always located at least the predefined minimum obstacle distance from real objects/obstacles/walls on that basis. The map might be stored in the memory 46.

It was explained above that the one or more processors 40 control movement of the hovering drone 30a into different locations while the user 18 is experiencing mediated reality at least in part via the rendering of virtual visual content on the display 32 of the hovering drone 30a, and that the one or more processors 40 may control the real location of the hovering drone 30a based at least in part on the real location 13 of the user 18. That is, a detected change in the real location 13 of the user 18 causes the one or more processors 40 to cause the real location of the hovering drone 30a to change.

However, it might not be possible for the one or more processors 40 to cause the hovering drone 30a to move to a desired real location (for example, following detected movement of a user 18 or otherwise), due to the presence of a real obstacle preventing the hovering drone 30a from reaching the desired real location. If the one or more processors 40 determine that a real obstacle will impede movement of the hovering drone 30a if an adjustment is made to move the real location of the hovering drone 30a into a particular real location, the one or more processors 40 might decide to remap the virtual space 20, 90 to real space 10 instead of moving the hovering drone 30a to that real location.

Remapping virtual space 20, 90 to real space 10 changes the way that virtual space 20, 90 corresponds to real space 10. Virtual space 20, 90 might be remapped to real space 10 such that a given change (movement over a distance) in the real location 13 of the user 18 causes a greater change (movement over a distance) in the virtual location 23 of the user 18 than would have been the case prior to the remapping. This enables the user 18 to explore more of the virtual space 20, 90 than would otherwise have been the case if the remapping had not been made. Remapping the virtual space 20, 90 to the real space 10 need not involve reorienting the virtual space 20, 90 relative to the real space 10; it might merely involve changing how a given distance in real space 10 corresponds to a given distance in virtual space 20, 90. Following the remapping, a translation movement in real space 10 might, for example, cause a magnified (larger) translation in the virtual space 20 than was the case prior to the remapping.

In some examples, virtual space 20, 90 might be remapped to real space 10 on one or more further occasions as the real location 13 of the user 18 approaches the real location of the hovering drone 30a. After virtual space 20, 90 is remapped to real space 10 on each occasion, a given change (movement over a distance) in the real location 13 of the user 18 causes a greater change (movement over a distance) in the virtual location 23 of the user 18 than would have been the case previously.

In some instances, if the user 18 is determined to be proximal to a periphery of the virtual space 20, 90 provided by the mediated reality content, the one or more processors 40 might cease remapping virtual space 20, 90 to real space 10 as the user's 18 real location 13 changes.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . ." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the applicant may seek protection via the claims in respect of any patentable feature or combination of features hereinbefore referred to and/or shown in the drawings whether or not emphasis has been placed thereon.

The claimed apparatus may take many different forms. In some examples, the claimed apparatus 30 might merely be at least one processor 40 and memory 46 including computer program code 48 that is configured to cause the processor(s)

40 to perform various actions. The claimed apparatus need not include the display(s) 32 and/or the input circuitry 44.

In other examples, the claimed apparatus might be a single, complete electronic device, such as the server 30*b* described above and illustrated in FIG. 7. It was explained above that the server 30*b* could be a hand portable electronic device such as a mobile telephone or a tablet computer, or indeed an electronic device of a different form. In such examples, the claimed apparatus may receive inputs from and/or provide outputs to: the hovering drone 30*a*, the head mounted audio device 32 and/or the upstanding sensors 144. The claimed apparatus need not, however, comprise these elements.

We claim:

1. Apparatus comprising:
   at least one processor; and
   at least one non-transitory memory including computer program code, the at least one memory and the computer program code configured to, with the at least one processor, cause the apparatus to:
   cause rendering of mediated reality content to a user, wherein the mediated reality content comprises virtual visual content rendered on a display of a hovering drone and virtual aural content;
   determine a real location of the user in real space; and
   cause dynamic adjustment of a real location of the hovering drone, relative to the determined real location of the user, based at least in part on at least one characteristic of the mediated reality content rendered to the user, wherein one or more characteristics of the at least one characteristic are based, at least partially, on at least one of:
   the virtual aural content, or
   a comparative importance of the virtual visual content and the virtual aural content, wherein the comparative importance is defined with at least one of:
   metadata associated with the virtual visual content and the virtual aural content, or a user selection associated with at least one of the virtual visual content or the virtual aural content.

2. The apparatus of claim 1, where the at least one memory and the computer program code are configured to, with the at least one processor, cause the apparatus to
   determine a real point of view of the user; and
   dynamically adjust the real location of the hovering drone based at least in part on the determined real point of view of the user.

3. The apparatus of claim 1, wherein the real location of the hovering drone is dynamically adjusted based at least in part on the virtual visual content rendered, to the user, on the display of the hovering drone.

4. The apparatus of claim 3, wherein the real location of the hovering drone is dynamically adjusted, comprising reducing a distance between the real location of the hovering drone and the real location of the user based at least in part on the user approaching an interactive virtual visual object provided with the virtual visual content.

5. The apparatus of claim 4, wherein the hovering drone is configured to detect touch input from the user and/or non-touch gesture input from the user, and reducing the distance between the real location of the hovering drone and the real location of the user is configured to at least one of:
   enable the touch input and/or the non-touch gesture input from the user to be detected or
   improve an accuracy of detection of the touch input and/or the non-touch gesture input from the user.

6. The apparatus of claim 1, wherein the real location of the hovering drone is dynamically adjusted based at least in part on the virtual aural content rendered to the user.

7. The apparatus of claim 1, wherein the at least one characteristic of the mediated reality content depends on the comparative importance of the virtual visual content and the virtual aural content.

8. The apparatus of claim 7, wherein the at least one memory and the computer program code are configured to, with the at least one processor, cause a distance between the real location of the hovering drone and the real location of the user to be increased to a predefined maximum distance, based at least in part on a determination that the virtual aural content is more important than the virtual visual content in a given portion of the mediated reality content.

9. The apparatus of claim 6, wherein the at least one memory and the computer program are code configured to, with the at least one processor, cause the apparatus to adjust gain of the virtual aural content based at least in part on a distance between the real location of the user and the real location of the hovering drone.

10. The apparatus of claim 7, wherein the at least one memory and the computer program code are configured to, with the at least one processor, cause a distance between the real location of the hovering drone and the real location of the user to be reduced, based at least in part on a determination that the virtual visual content is more important than the virtual aural content in a given portion of the mediated reality content.

11. The apparatus of claim 10, wherein the hovering drone is configured to detect touch input from the user and/or non-touch gesture input from the user, and reducing the distance between the real location of the hovering drone and the real location of the user is configured to at least one of:
   enable the touch input and/or the non-touch gesture input from the user to be detected or
   improve an accuracy of detection of the touch input and/or the non-touch gesture input from the user.

12. The apparatus of claim 1, wherein the dynamic adjustment of the real location of the hovering drone is configured to determine a virtual field of view of the virtual visual content rendered on the display of the hovering drone.

13. A method, comprising:
   causing rendering of mediated reality content to a user, wherein the mediated reality content comprises virtual visual content rendered on a display of a hovering drone and virtual aural content;
   determining a real location of the user in real space; and
   causing dynamic adjustment of a real location of the hovering drone, relative to the determined real location of the user, based at least in part on at least one characteristic of the mediated reality content rendered to the user, wherein one or more characteristics of the at least one characteristic are based, at least partially, on at least one of:
   the virtual aural content, or
   a comparative importance of the virtual visual content and the virtual aural content, wherein the comparative importance is defined with at least one of:
   metadata associated with the virtual visual content and the virtual aural content, or a user selection associated with at least one of the virtual visual content or the virtual aural content.

14. The method of claim 13, further comprising:
   determining a real point of view of the user; and causing dynamically adjustment of the real location of the hovering drone based at least in part on the determined real point of view of the user.

15. The method of claim 13, wherein the real location of the hovering drone is dynamically adjusted based at least in part on the virtual visual content rendered, to the user, on the display of the hovering drone.

16. The method of claim 13, further comprising:
causing a distance between the real location of the hovering drone and the real location of the user to be increased to a predefined maximum distance, based at least in part on a determination that the virtual aural content is more important than the virtual visual content in a given portion of the mediated reality content.

17. A non-transitory program storage device readable with a machine, tangibly embodying computer program instructions that, when performed with one or more processors, cause the one or more processors to perform at least:
causing rendering of mediated reality content to a user, wherein the mediated reality content comprises virtual visual content rendered on a display of a hovering drone and virtual aural content;
determining a real location of the user in real space; and
causing dynamic adjustment of a real location of the hovering drone, relative to the determined real location of the user, based at least in part on at least one characteristic of the mediated reality content rendered to the user, wherein one or more characteristics of the at least one characteristic are based, at least partially, on at least one of:
the virtual aural content, or
a comparative importance of the virtual visual content and the virtual aural content, wherein the comparative importance is defined with at least one of: metadata associated with the virtual visual content and the virtual aural content, or a user selection associated with at least one of the virtual visual content or the virtual aural content.

18. The non-transitory program storage device of claim 17, wherein the computer program instructions, when performed with the one or more processors, cause the one or more processors to perform at least:
causing determination of a real point of view of the user; and
causing dynamic adjustment of the real location of the hovering drone based at least in part on the determined real point of view of the user.

19. The non-transitory program storage device of claim 17, wherein the real location of the hovering drone is dynamically adjusted based at least in part on the virtual visual content rendered, to the user, on the display of the hovering drone.

20. The non-transitory program storage device of claim 17, wherein the computer program instructions, when performed with the one or more processors, cause the one or more processors to perform at least:
cause a distance between the real location of the hovering drone and the real location of the user to be increased to a predefined maximum distance, based at least in part on a determination that the virtual aural content is more important than the virtual visual content in a given portion of the mediated reality content.

* * * * *